Dec. 11, 1928.
J. A. MORGAN
1,695,055
WATER CIRCULATION CONTROL MECHANISM FOR AUTOMOBILES
Filed Jan. 29, 1923
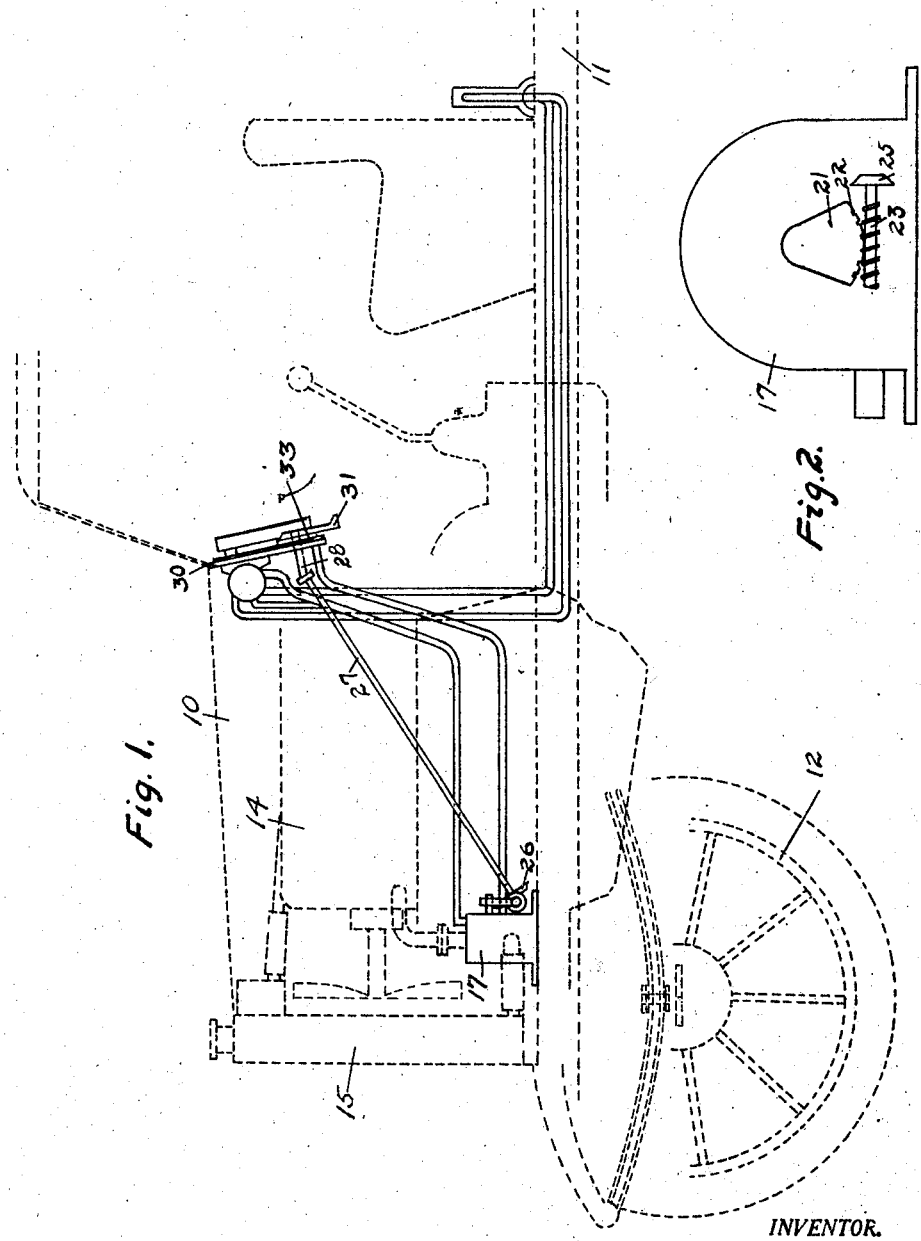
INVENTOR.
John A. Morgan
BY B. J. Craig
ATTORNEY.

Patented Dec. 11, 1928.

1,695,055

UNITED STATES PATENT OFFICE.

JOHN A. MORGAN, OF LOS ANGELES, CALIFORNIA, ASSIGNOR TO THE JOHN A. MORGAN MACHINERY COMPANY, OF LOS ANGELES, CALIFORNIA.

WATER-CIRCULATION-CONTROL MECHANISM FOR AUTOMOBILES.

Application filed January 29, 1923. Serial No. 615,689.

This invention relates to water circulation systems and the general object is to provide an improved control mechanism for such systems.

One of the objects of the invention is to provide an automobile, having a water cooled engine with a pump for causing circulation of the water through the cooling system together with means whereby the amount of water delivered by the pump may be adjusted by the driver.

A further object of the invention is to provide a radiator for heating an automobile together with means manually controllable from the driver's position for causing the water to circulate through the radiator.

Further and other objects of the invention will be apparent from the following specifications taken in connection with the accompanying drawings wherein Fig. 1 is an elevation of an automobile showing my invention applied thereto; Fig. 2 is an elevation of a water circulation pump used in connection with my invention.

Referring to the drawing by reference characters, I have shown an automobile at 10 provided with the usual frame 11 supported upon wheels 12. An engine for propelling the automobile is shown at 14. This engine is of the usual water cooled, gasoline, type.

In order to insure a complete circulation of the water through the water jacket and radiator 15, I provide a circulation pump 17 which may be mounted adjacent the engine, as shown, and which may be driven from the propelling engine 14 in any desired manner. I prefer that the pump 17 be similar to the pumps described in my co-pending application, Serial No. 605,758, filed December 9, 1922, and now matured into Patent 1,516,053, granted November 18, 1924.

The pump referred to in my above mentioned application is of the rotary displacement type wherein rotating pistons move radially within the casing during the intake and discharge stroke. The amount of throw of the pistons is controlled by an arm shown in the drawings of the present application at 21. The movement of the arm 21 either to the right or the left serves to increase or diminish the discharge from the pump without a corresponding change in the speed of rotation of the pump. For a more complete description of the construction of the pump, reference is hereby made to the above mentioned copending application.

In order that the amount of water delivered by the pump 17 may be readily adjusted I provide teeth in the lower end of this arm as shown at 22 which teeth are adapted to mesh with the teeth on a worm 23. The worm being mounted for rotation upon a shaft arranged on the front of the casing and having a bevel gear 25 fixed thereto. This bevel gear 25 is adapted to be driven by a second bevel gear 26 shown (in Fig. 1) as mounted on a shaft 27. The shaft 27 is coupled through the agency of a universal joint to a shaft 28 shown as passing through the dash board 30 of the automobile. The end of the shaft is provided with a suitable operating lever 31 which is provided at one end with an indicator 32. A plate 33 beneath the operating lever 31 may have graduations thereon to indicate the amount of movement of the lever 31.

From the above description it will be seen that upon operation of the handle 31, the gear 26 will cause the gear 25 to rotate, thus rotating the worm 23 and causing the arm 21 to move back or forward to vary the amount of flow of water delivered by the pump.

From the foregoing, it will be apparent that I have provided an improved control for water circulation systems whereby the amount of water which passes through the cooling system of the automobile may be accurately and conveniently regulated without changing the speed of the engine.

Having thus described my invention, I claim:

In an automobile, an engine including a water jacket, a cooling radiator, means connecting said radiator and said water jacket, a power driven rotary pump interposed between said radiator and said water jacket in said connecting means, manually actuated means operable from the driver's seat for varying the action of the rotor of said pump whereby the water head delivered from said pump will be varied without changing the speed of said pump rotor.

In testimony whereof, I hereunto affix my signature.

JOHN A. MORGAN.